United States Patent

Hsieh

[11] Patent Number: 5,876,865
[45] Date of Patent: Mar. 2, 1999

[54] ELECTROLUMINESCENT POLYMER COMPOSITIONS AND PROCESSES THEREOF

[75] Inventor: Bing R. Hsieh, Webster, N.Y.

[73] Assignee: Xerox Corporation, Stamford, Conn.

[21] Appl. No.: 106,554

[22] Filed: Jun. 29, 1998

Related U.S. Application Data

[62] Division of Ser. No. 751,532, Nov. 13, 1996, Pat. No. 5,817,430.

[51] Int. Cl.$^6$ .................................................. H05B 33/00
[52] U.S. Cl. .......................... 428/690; 428/691; 428/917; 313/504
[58] Field of Search ..................................... 428/690, 917, 428/691; 313/504

[56] References Cited

U.S. PATENT DOCUMENTS 5,247,190   9/1993   Friend et al. .............................. 257/40

OTHER PUBLICATIONS

Burn et al., J. Chem. Soc., Chem. Commun., 1992, pp. 31–34, Jun. 1992.

*Primary Examiner*—Charles Nold
*Attorney, Agent, or Firm*—John L. Haack

[57] ABSTRACT

A process for the preparation of polymers comprising: polymerizing at least one monomer of the formula $X-CH_2-Ar-CH_2-X'$ in the presence of a base and at least one chain end controlling additive of the formula $R-H$ to form a soluble conjugated poly(arylene vinylene) of the formula $$R-CH_2-[AR-CH=CH-]_n-Ar-CH_2-R$$

where X and X' are electron withdrawing groups, R—H is a compound containing at least one acidic proton, R is a nucleophile, Ar is an aryl or aromatic group with from 5 to 30 carbon atoms, and n represents the number of repeating segments.

5 Claims, No Drawings

ELECTROLUMINESCENT POLYMER COMPOSITIONS AND PROCESSES THEREOF

This application is a divisional of application Ser. No. 08/751,532, filed Nov. 13, 1996 U.S. Pat. No. 5,817,430.

CROSS REFERENCE TO COPENDING APPLICATIONS AND PATENTS

Reference is made to commonly assigned copending applications: U.S. Ser. No. 08/313,963 filed Sep. 28, 1994, entitled "ELECTROLUMINESCENT DEVICE", which discloses an electroluminescent (EL) device including a polymeric tetraaryl-substituted biphenyldiamine; U.S. Ser. No. 08/707,162 (D/96172) filed Sep. 3, 1996 entitled "ELECTROLUMINESENT DEVICES"; U.S. Ser. No. 08/707,260 (D/96174) filed Sep. 3, 1996, entitled "ELECTROLUMINESENCT DEVICES"; and U.S. Ser. No. 08/751,530 (D/96545) filed concurrently herewith, entitled "ELECTROLUMINESCENT POLYMER COMPOSITIONS AND PROCESSES THEREOF".

Attention is directed to commonly owned and assigned U.S. Pat. No. 5,558,904, issued Sep. 24, 1996, entitled "ELECTROLUMINESCENT DEVICES CONTAINING A CONJUGATED POLYMER OBTAINED VIA HALOGEN PRECURSOR ROUTE CHEMISTRY".

The disclosures of each of the aforementioned copending applications and patents are totally incorporated herein by reference.

BACKGROUND OF THE INVENTION

The present invention relates to electroluminescent polymer compositions and processes for the preparation and use thereof in, for example, electroluminescent devices such as electroluminescent displays and electrochemical cells.

More particularly, the invention relates to polymer compositions and to processes for making and using in, for example, high performance, that is, high stability and high luminosity electroluminescent displays and devices.

The present invention, in embodiments, is directed to processes for preparing soluble poly(p-arylene vinylene) polymers, especially poly(p-phenylene vinylene) polymers, wherein at least one solubilizing side chain or substitutent is present in the monomer imparts desirable solubility and processibility properties to the resulting polymer product. The present invention is also directed toward polymerization processes for controlling the molecular weight of the polymers, the functionality on the polymer chain ends, and polymer architecture using chain end controlling additives, which controlled factors contribute to improved stability and performance of light emitting devices constructed therefrom. By adjusting the ratio of a chain end controlling additive to a monomer, it is possible to control the molecular weights of the polymer. The higher the ratio, the lower the molecular weight of the polymer product. In extreme cases, one can prepare oligomeric phenylene vinylenes by using large amount of chain initiating additive(s). The use of chain end controlling additives provides a simple and general method for preparing poly(p-phenylene vinylene) polymers with specific chain end functionality. The chain end controlling additives generally serve to initiate and terminate polymerization and are incorporated in the polymer structure ultimately becoming bound at the ends of the polymer chain. The use of a chain end controlling additives with two or more polymerization initiation and termination site enables the preparation of block, branched, and grafted poly(p-phenylene vinylenes). Highly stable poly(p-phenylene vinylene) light emitting devices can be achieved by controlling the polymer molecular weights, chain ends, and architectures through chain end controlling additives.

PRIOR ART

Conjugated polymers are an important class of light emitting polymers for electroluminescent (EL) devices. There are two principal approaches to the fabrication of conjugated polymer thin films, namely, the precursor approach and side chain approach. The former relies on the preparation of a soluble precursor polymer which can be cast into thin films. The precursor polymer can then be converted to the final conjugated polymer films through solid-state thermo- or photo-conversion. Friend et al., disclosed EL devices based on poly(p-phenylene vinylene) (PPV) thin films derived from a sulfonium precursor route, reference U.S. Pat. No. 5,247,190. Hsieh et al., disclosed similar PPV EL devices using halogen precursor routes as disclosed in the aforementioned commonly owned U.S. Pat. No. 5,558,904. Son et al., reported PPV based EL devices using a xanthate precursor route in *Science*, 1995, 269, 376–380. There are several problems associated with the precursor approach. First, the precursor polymers derived from these precursor routes have ill defined molecular structures because they are typically random copolymers containing 5–50% of converted segments. Second, expensive and potentially environmentally harmful photo- or thermo-conversion is required. Third, the presence of structural defects arising from incomplete thermoconversion and side reactions with volatile organic species generated during the thermal conversion. These aspects can lead to poor device properties and poor manufacture reproducibility.

The side chain approach of the present invention involves the polymerization of a monomer containing soluble substituents or side groups to afford a soluble conjugated polymer that can be cast into thin film directly without conversion. The polymerization of bis(halomethyl)benzenes in the presence of large excess base to give PPV products was first reported by Gilch et al., in *Journal of Polymer Science*: Part A-1, 4:1337 (1966). In principle, the adaptation of the Gilch route to the polymerization of a 1,4-bis (halomethyl)benzene containing solubilizing groups should give a soluble PPV derivative. Unfortunately, this is not the case in practice because of polymer product precipitation during polymerization. The precipitation may be caused by the high molecular weight, semicrystallinity and/or cross-linking of the product. As a result, the desired soluble product has been obtained in very low yields (<10%). The Gilch route is disadvantaged in that is lacks sufficient control over molecular weight of the polymer. Another problem of the Gilch route is the lack of control over polymer chain ends and polymer architecture.

The following United States patent is noted.

U.S. Pat. No. 5,247,190, issued Sep. 21, 1983, to Friend et al., discloses an electroluminescent device comprising a semiconductor layer in the form of a thin dense polymer film comprising at least one conjugated polymer, a first contact layer in contact with a first surface of the semiconductor layer, and a second contact layer in contact with a second surface of the semiconductor layer. The polymer film of the semiconductor layer has a sufficiently low concentration of extrinsic charge carriers that on applying an electric field between the first and second contact layers across the semiconductor layer so as to render the second contact layer positive relative to the first contact layer charge carriers are injected into the semiconductor layer and radiation is emitted from the semiconductor layer. The polymer film can be poly(p-phenylenevinylene) wherein the phenylene ring may optionally carry one or more substituents each independently selected from alkyl, alkoxy, halogen or nitro.

The disclosure of the aforementioned document is totally incorporated herein by reference.

There exists a need for polymerization processes for controlling the molecular weight of the polymers, the functionality on the polymer chain ends, and polymer architecture with simple and direct methodologies.

Still further, there is a need for improved methods for the preparation of block, branched, and grafted poly(p-phenylene vinylenes).

Solutions to the above problems and needs have been unexpectedly found in the compositions and processes of the present invention which provide superior polymerization processes, and stability and performance of light emitting devices formed therefrom by using chain end controlling additives in the polymerization processes of forming soluble and conjugated polymers.

SUMMARY OF THE INVENTION

It is feature of this invention to overcome or minimize the problems encountered in the art and provide processes and polymer compositions which are suitable for use in electroluminesenct and electrochemical cell applications.

Other features of the present invention include providing:

processes for the preparation of polymers comprising: polymerizing at least one monomer of the formula X—CH$_2$—Ar—CH$_2$—X' in the presence of a base and at least one chain end controlling additive of the formula R—H to form a soluble conjugated poly(arylene vinylene) of the formula

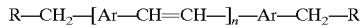

where X and X' are electron withdrawing groups, R—H is a compound containing at least one acidic proton, R is a nucleophile, Ar is aryl or aromatic group with from 5 to 30 carbon atoms, for example, a 1,4-disubstituted aromatic group, and n represents the number of repeating segments.and is from about 5 to about 100,000, and in embodiments, wherein the Ar contains at least one additional solubilizing substitutent with from 2 to about 25 carbon atoms;

an electroluminescent device comprising a conductive transparent or semitransparent conductive substrate; an electroluminescent polymer prepared by polymerizing a monomer of the formula XCH$_2$—Ar—CH$_2$X' in the presence of a base and at least one chain end controlling additive of the formula R—H to form a soluble conjugated poly(arylene vinylene) of the formula

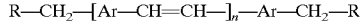

where X and X' are electron withdrawing groups, R—H is a materials containing at least one acidic proton with its pKa values in the range of from about 4 to about 25, Ar is a 1,4-phenylene compound, 1,4-naphthalene compound, or 2,5-pyridine compound, and n is an integer from about 5 to about 100,000, which polymer is deposited on the substrate as a thin film; and at least one low work function metal electrode deposited on the polymer thin film; and a light-emitting electrochemical cell device comprising: a conductive transparent or semitransparent conductive substrate; a polyelectrolyte doped electroluminescent polymer prepared by polymerizing a 1,4-disubstituted monomer of the formula XCH$_2$—Ar—CH$_2$X' in the presence of a base and at least one chain end controlling additive of the formula R—H to form a soluble conjugated poly(arylene vinylene) of the formula

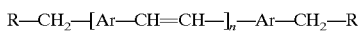

where X and X' are electron withdrawing groups, R—H is a compound containing at least one acidic proton with a pKa value of from about 4 to about 25, Ar is a 1,4-phenylene, 1,4-naphthalene, or 2,5-pyridine compound containing at least one hydrophilic or hydrophobic substituent with from 2 to about 25 carbon atoms selected from the group of alkoxy, oligomeric alkylene glycols, crown ethers, or sulfonic acids, and n is an integer from about 5 to about 100,000, which polymer is deposited on the substrate as a thin film; and at least one metal electrode deposited on the polyelectrolyte doped polymer thin film; and wherein the electroluminecent polymers of the present invention exhibit, in embodiments, electroluminescence at from about 400 to about 700 nm.

These and other features are achieved, in embodiments, of the present invention as described and illustrated herein.

DETAILED DESCRIPTION OF THE INVENTION

The present invention provides, in embodiments, processes for the preparation of electroluminecent polymers comprising polymerizing at least one monomer, for example one to about five different monomers, of the formula X—CH$_2$—Ar—CH$_2$—X' in the presence of a base and at least one, for example one to about five monomers, chain end controlling additive of the formula R—H to form a soluble conjugated poly(arylene vinylene) of the formula

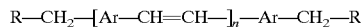

where X and X' are electron withdrawing groups, R—H is a compound containing at least one acidic proton, for example, one to about 20 acidic protons, where R can be a nucleophile of, for example, aliphatic or aromatic compounds and polymers, generated from the reaction of the base with the R—H compound, Ar is a 1,4-disubstituted aryl or aromatic compound with from 5 to about 30 carbon atoms, and n is an integer from about 5 to about 100,000. The 1,4-disubstituted Ar preferably contains at least one additional substitutent with from 2 to about 25 carbon atoms. In preferred embodiments the Ar is a 1,4-phenylene compound, a 1,4-naphthalene compound, or a 2,5-pyridine compound.

The electron withdrawing groups X and X' can be independently selected from halogens such as chloride, bromide, fluoride, or iodide, sulfonium halides, ammonium halides such as tetraalkyl ammonium bromide, alkylsulfoxides such as dimethyl sulfoxide, phenylsulfoxide, alkylsulfones, phenylsulfone, thiocyanate, N,N-diethyldithiocarbamate, diethyl phosphonate, cyano, nitro, ethyl xanthate, methylthio, phenylthio, pentafluorophenyl, trifluoromethyl, and the like groups.

The chain end controlling additive can be aliphatic or aromatic compounds, and polymers that contain acidic protons that can be deprotonated by strong bases such as alkaline metal hydroxides such as sodium hydroxide, alkaline metal alkoxides such as sodium methoxide, alkaline metal hydrides such as lithium aluminum hydride, alkaline metal amides, and the like. Structures of chain end controlling additives are of the general formulas

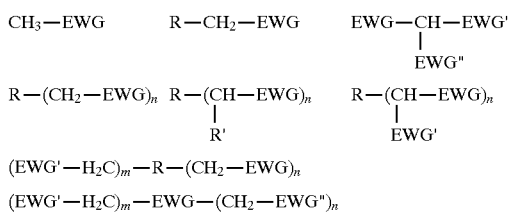

where m and n are integers of from 1 to 4, and EWG, EWG', and EWG" are the same or different electron withdrawing groups, such as F, Cl, Br, I, CN, CF$_3$, COCH$_3$, CO$_2$CH$_3$, CONHCH$_3$, SOCH$_3$, SOPh, SO$_2$Ph,

NO$_2$ SO$_2$CH$_3$, SCH$_3$, —SCOC$_2$H$_5$, —SCN(C$_2$H$_5$)$_2$,

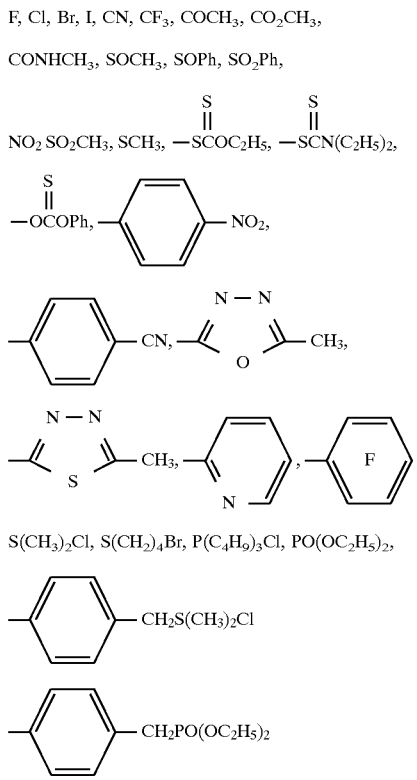

S(CH$_3$)$_2$Cl, S(CH$_2$)$_4$Br, P(C$_4$H$_9$)$_3$Cl, PO(OC$_2$H$_5$)$_2$, and the like groups, where R and R' are aliphatic or aromatic groups such as n-butyl, n-hexyl, benzene, naphthalene, anthracene, thiophene, pyridine, biphenyl, diphenyl ether, diphenyl sulfide, diphenylsulfone, diphenylsulfoxide, diphenyldimethylsilane, dibenzyl, 1,2-diphenoxyethane, triphenylamine, triphenylphosphine, tetraphenylmethane and the like; R and R' can also be electron withdrawing groups such as carbonyl, sulfone, ester, including those R and R' recited above. The alpha-protons adjacent to an electron withdrawing groups are generally acidic with pKa values in the range of about 4 to about 25, and are alternatively referred to as "active methylene" compounds, which includes for example, methyl (CH$_3$—), methylene (—CH$_2$—) and methine (≡CH—) configurations, reference for example, J. March, *Advanced Organic Chemistry*, 4th ed. John Wiley and Sons, 1992, Chapter 8.

The chain end controlling additive is preferably an acidic compound with a pK$_a$ of less than about 35, and preferably from about 4 to about 25. The chain end controlling additive of the formula R—H can be selected, for example, from hydrocarbons, alcohols, phenols, mercaptans, primary and secondary amines, amides, carboxylic acids, sulfonamides, alkaline metal salts thereof, and mixtures thereof. The chain end controlling additive preferably contains at least one acidic proton, alpha or adjacent to a least one electron withdrawing group, for example, halogen, cyano, nitro, acetyl, methyl ester, sulfoxide, sulfone, sulfide, 4-nitrophenyl, 4-cyanophenyl, benzoxazol-2-yl, benzothiazol-yl, 1,3,4-oxadiazol-2-yl, thiadiazol-2-yl, benzimidazol-2-yl, pyrid-2-yl, quinol-2-yl, quinoxal-2-yl, thiocyanate, sulfonium halides, ammonium halides, N,N-diethyldithiocarbamate, triphenylphosphonium halides, diethyl phosphonate, ethyl xanthate, methylthio, phenylthio, pentafluorophenyl, trifluoromethyl, and mixtures thereof.

Exemplary chain end controlling additive compounds include 4-t-butyl benzylchloride, nitromethane, nitrobutane, acetonitrile, chloroform, methylene chloride, dimethylsulfoxide, sulfolane, acetone, methyl ethyl ketone, acetylacetone, ethyl acetoacetate 1-chloromethyl-4-methoxybenzene, nitromethyl benzene, 1,4-bis(bromomethyl)-2-cyanobenzene, 1,4-bis(chloromethyl)-2-nitrobenzene, 1,4-bis(chloromethyl)-2,3,5,6-tetrachlorobenzene, 1,4-bis(chloromethyl)-2,3,5,6-tetrafluoro benzene, 1-chloromethyl-4-dichloromethyl-benzene, 1,3-bis(chloromethyl) benzene, 1,2-bis (chloromethyl) benzene, phenylacetonitrile, N,N-diethylchloroacetamide, diethyl 4-chlorobenzylphosphonate, diethyl cyanomethyl phosphonate, n-butanol, 4-t-butylphenol, n-octylamine, n-octadecyl mercaptan, phenylacetonitrile, benzoic acid, N,N-diethylchloroacetamide, diethyl 4-chlorobenzylphosphonate, diethyl cyanomethylphosphonate and 2-nitro-1,4-xylylenebis(tetrahydrothiophenium chloride), p-xylylenebis(triphenylphosphonium bromide), benzyltetrathiophenium chloride, ethylene gylcol monovinyl ether, ethylene gylcol monomethacrylate, 4-vinylbenzyl chloride, 4-acetoxystyrene, glycidol, 5-norbornene-2-ol, 5-norbornene-2-methanol, 5-norbornene-2,2-dimethanol, 4-hydroxyphenyl-2-oxazoline, 4-hydroxymethylphenyl-2-oxazoline, and mixtures thereof.

Specific chain end controlling additives include, but are not limited to nitromethane, nitrobutane, acetonitrile, chloroform, methylene chloride, dimethylsulfoxide, sulfolane, acetone, methyl ethyl ketone, acetylacetone, 1-chloromethyl-4-methoxy benezene, 1-bromomethyl-4-t-butylbenzene, nitromethylbenezene, 1,4-bischloromethyl-2-nitrobenezene, 1,4-bisbromomethyl-2-cyanobenzene, 1-chloromethyl-4-dichloromethylbenezene, 1,3-di (chloromethyl)benzene, 1,2-di(bromomethyl)-benzene, 9,10-bis(chloromethyl)anthracene, 2,6-bischloromethylnaphthalene, p-xylylenebis (tetrahydrothiophenium chloride), p-xylylenebis (triphenylphosphonium bromide), benzyltetrathiophenium chloride, phenylacetonitrile, N,N-diethylchloroacetamide, diethyl 4-chlorobenzylphosphonate, diethyl cyanomethylphosphonate, and the like compounds. Other compounds containing acidic groups such as phenols, amines, mercaptans, amides, carboxylic acids, and the like, can also be used as chain end controlling additives. The alkaline metal salts of amines, mercaptans, amides, carboxylic acids, nitrites, and phenols can also be selected.

In embodiments, when polymerization of the monomer compound via a free radical or suitable related polymerization mechanism is selected, the chain end controlling additive selected can be a mixture of a free radical initiator compound and a stable free radical compound, as disclosed in commonly owned and assigned U.S. Pat. No. 5,322,912, the disclosure of which is incorporated herein in its entirety.

The reactive monomer of the formula XCH$_2$—Ar—CH$_2$X' can be, for example, 1-halomethyl-4-halomethyl benzene compounds, 1,4-bis(tetrahydrothiophenium methyl)benzene compounds, 1,4-bis(N,N-dialkyldithiocarbamatomethyl)benzene compounds, 1,4-bis (phenylsulfoxomethyl)benzene compounds, 1,4-bis (phenylsulfomethyl)benzene compounds, 1,4-bis(ethyl xanthatomethyl)benzene compounds, 1,4-bis (alkylthiomethyl)benzene compounds, 1,4-bis(halomethyl) naphthalene compounds, 1,4-bis(tetrahydrothiophenium methyl) naphthalene compounds, 1,4-bis(N,N-dialkyldithiocarbamatomethyl) naphthalene compounds, 1,4-bis(phenylsulfoxomethyl) naphthalene compounds, 1,4-bis(phenylsulfomethyl) naphthalene compounds, 1,4-bis (ethyl xanthatomethyl) naphthalene compounds, 1,4-bis (alkylthiomethyl) naphthalene compounds, 2,5-bis (halomethyl)-pyridine compounds, 2,5-bis (tetrahydrothiophenium methyl) pyridine compounds, 2,5-bis(N,N-dialkyldithiocarbamatomethyl) pyridine compounds, 2,5-bis(phenylsulfoxomethyl) pyridine compounds, 2,5-bis(phenylsulfomethyl) pyridine compounds, 2,5-bis(ethyl xanthatomethyl) pyridine compounds, 2,5-bis(alkylthiomethyl) pyridine compounds, and mixtures thereof.

The monomer compounds of the formula X—CH$_2$—Ar—CH$_2$—X' can also be, for example, 2-methoxy-5-(2'-ethylhexyloxy)-1,4-bis(chloromethyl)benzene, 2,5-dihexyloxy-1,4-bis(chloromethyl)benzene, 2,3-diphenyl-5-n-octyl-1,4-bis(chloromethyl) benzene, 2-methylthio-5-(2'-ethylhexyloxy)-1,4-bis(chloromethyl)benzene, 2-(2'-ethylhexyloxy)-5-diphenylamino-1,4-bis(chloromethyl) benzene, 2-(2'-ethylhexylthio)-5-diphenylamino-1,4-bis (chloromethyl)benzene, 2,5-di-n-octylthio-1,4-bis (bromomethyl) benzene, 2,5-(di-p-tolylamino)-1,4-bis (chloromethyl)benzene, 2,3-diphenyl-5-n-butyl-6-n-pentyl-1,4-bis(chloromethyl)benzene, 2,3,5,6-tetrabutoxy-1,4-bis (chloromethyl)benzene, 2-(4'-t-butylstyryl)-1,4-bis (chloromethyl)benzene, 2,5-bis(4'-n-butylstyryl)-1,4-bis (chloromethyl)benzene, 1,1-diphenyl-2-(1',4'-bis (chloromethylphenyl)ethylene, 1,1,2-triphenyl-2-[1 ,'4'-bis (chloromethyl)phenyl] ethylene, 2,5-bis(2'-phenyl-1',3',4'-oxadiazol-5'-yl)-1,4-bis(chloromethyl) benzene, 2,5-bis(2', 2'-di-p-tolylethylene)-1,4-bis(chloromethyl)benzene, 2,5-bis(p-t-octylphenoxy)-1,4-bis(chloromethyl)benzene, 2,5-bis(oligoethylene glycoloxy)-1,4-bis(chloromethyl) benzene, 1,4-bis(chloromethyl)benzo-18-crown-6, 2,3-diphenyl-5-(4'-benzo-18-crown-6)-1,4-bis(chloromethyl) benzene, 2-[4'-(2"-phenyl-1",3",4"-oxadiazol-5"-yl) phenoxy]-1,4-bis(chloromethyl)benzene, 2,5-bis[4'-(2"-phenyl-1",3",4"-oxadiazol-5"-yl)phenoxy]-1,4-bis (chloromethyl)benzene, 2-[4'-(di-p-t-butylphenylamino) phenoxy] 1,4-bis(chloromethyl)benzene, 2,5-bis[4'-(di-p-tolylamino) phenoxy)]-1,4-bis(chloromethyl)benzene, 2-[(p-styryl)phenoxy]-1,4-bis(chloromethyl)benzene, 2,5-bis (p-styrylphenoxy)-1,4-bis(bromomethyl)benzene, 2-[(di-p-tolylaminophenyl)methyleneoxy]-1,4-bis(chloromethyl) benzene, 2,5-bis[(di-p-tolylaminophenyl)methyleneoxy]-1, 4-bis(chloromethyl)benzene, 2-[4'-(di-p-tolylaminophenyl) butoxy]-1,4-bis(chloromethyl)benzene, 2,5-bis[4'-(di-p-tolylaminophenyl)butoxy]-1,4-bis(chloromethyl)benzene, 2,5-bis[(2"-phenyl-1",3",4"-oxadiazol-5"-yl)methyleneoxy] -1,4-bis(chloromethyl)benzene, 2,5-bis[4'-(2"-phenyl-1",3", 4"-oxadiazol-5"-yl)butyloxy]-1,4-bis(chloromethyl) benzene, N-n-octyl-N'-[2',5'-bis(chloromethyl)phenyl]-3,4, 9,10-perylenetetracarboxylic diimide, N-phenyl-N'-[1'-2',5'-bis(chloromethyl)benzyl]-3,4,9,10-perylenetetracarboxylic diimide, and mixtures thereof.

Useful monomers for preparing poly(p-arylene vinylenes) of the present

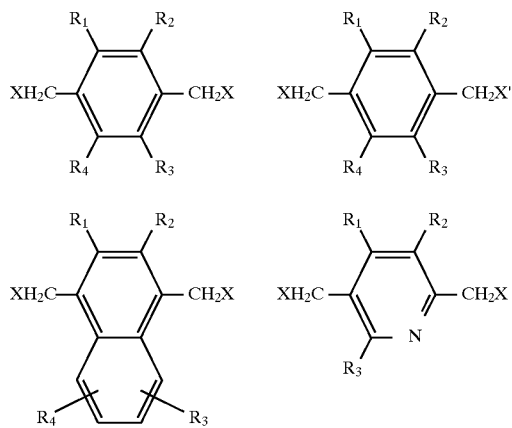

where $R_1$, $R_2$, $R_3$, $R_4$ can be independently selected from hydrogen, aliphatics, especially alkyls with from 1 to 25 carbon atoms such as methyl, n-hexyl, cyclohexyl, t-butyl, t-octyl, aromatics with from 6 to 25 carbon atoms, and structural analogues and homologues, such as, methoxy, butoxy, hexyloxy, phenoxy, phenylthio, diphenylamine, triphenylamine, 4-phenylazo, styryl, phenylethynyl, trimethylsilyl, trifluoromethyl, and benzothiazol-2-yl, and where X substituents are, for example, independently selected from electron withdrawing groups, such as, halogen (fluorine, chlorine, bromine, iodine), dimethylsulfonium halide, diethylsulfonium halide, and tetrahydrothiophenium halide, methylthio, methylsulfone, phenylsulfoxide, phenylsulfone, thiocyanate, N,N-diethyldithiocarbamate, diethyl phosphonate, cyano, nitro, ethylxanthate, and the like groups.

Examples of preferred monomers include

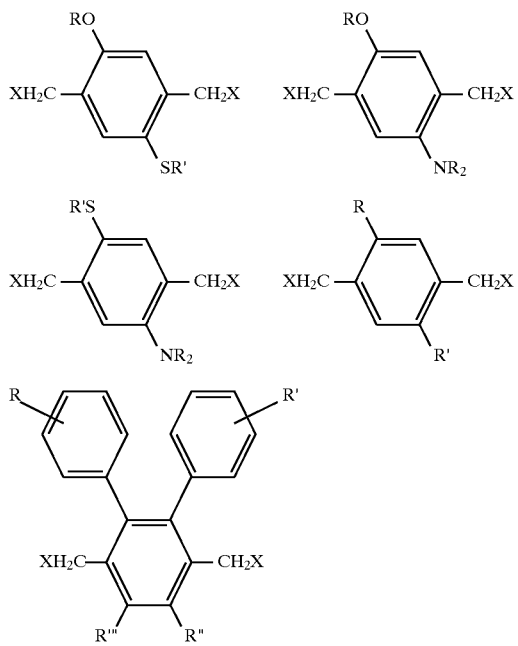

-continued
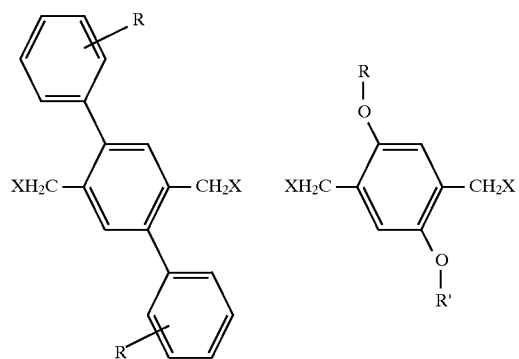
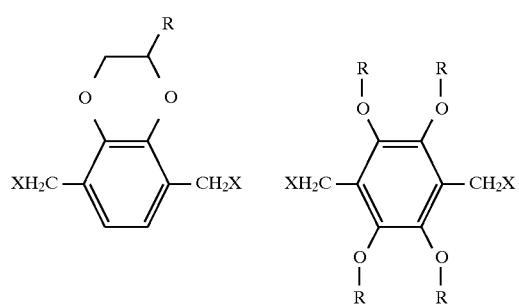
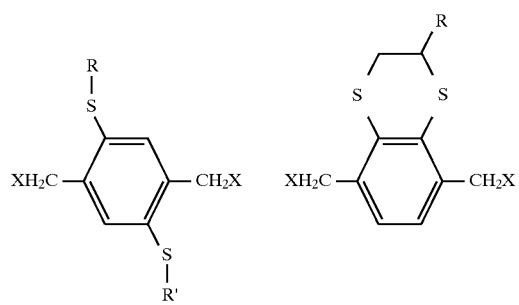
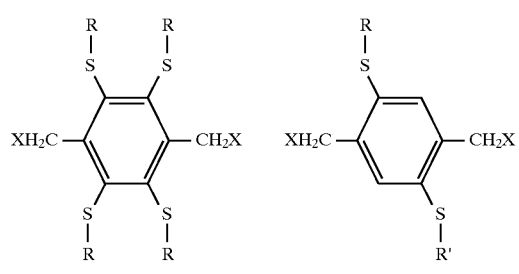
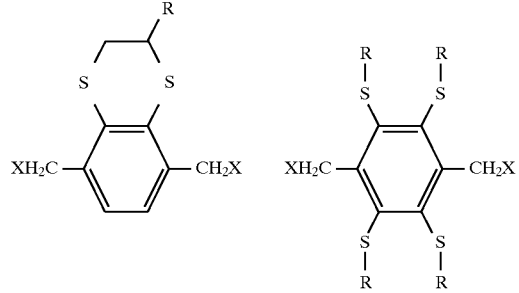
-continued
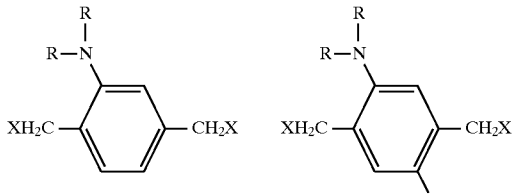
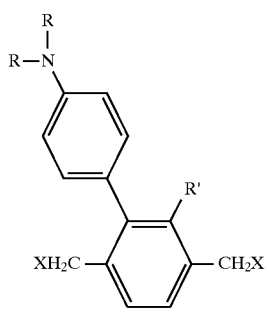
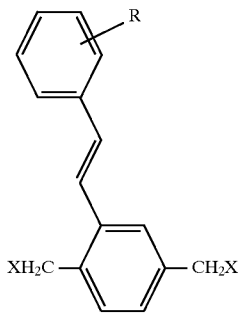
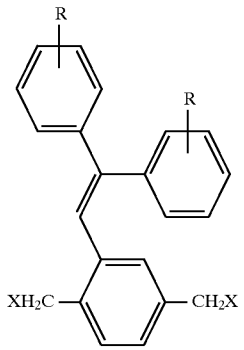
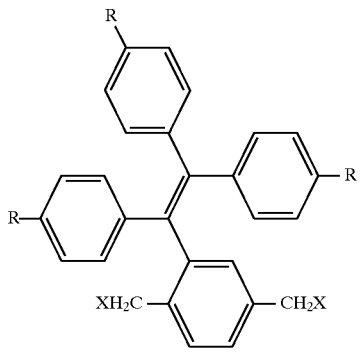

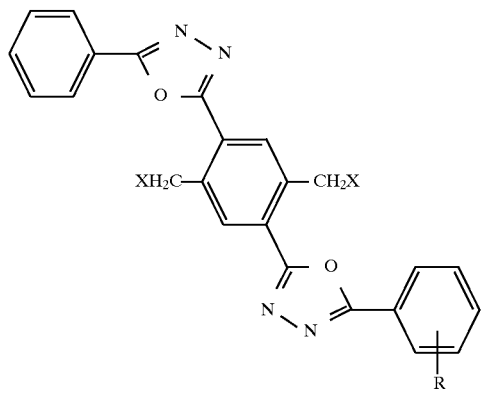
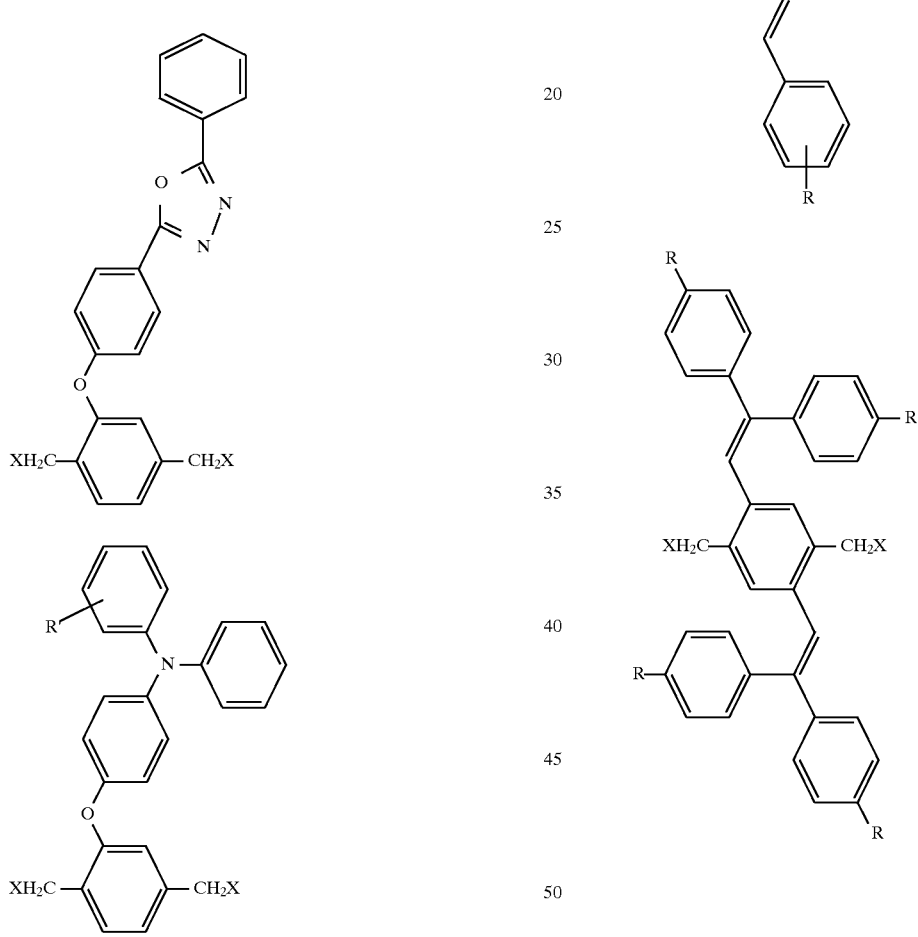

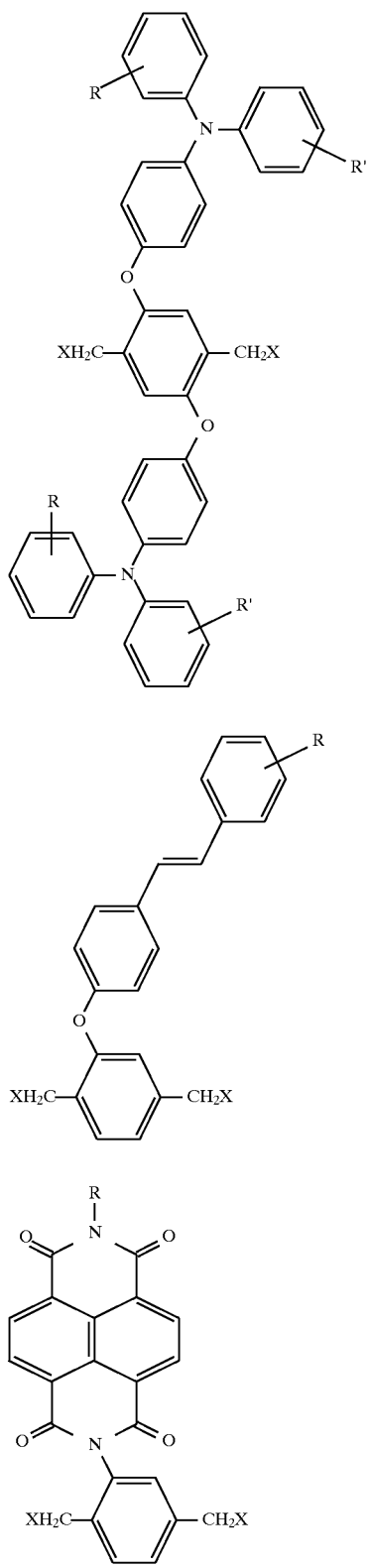
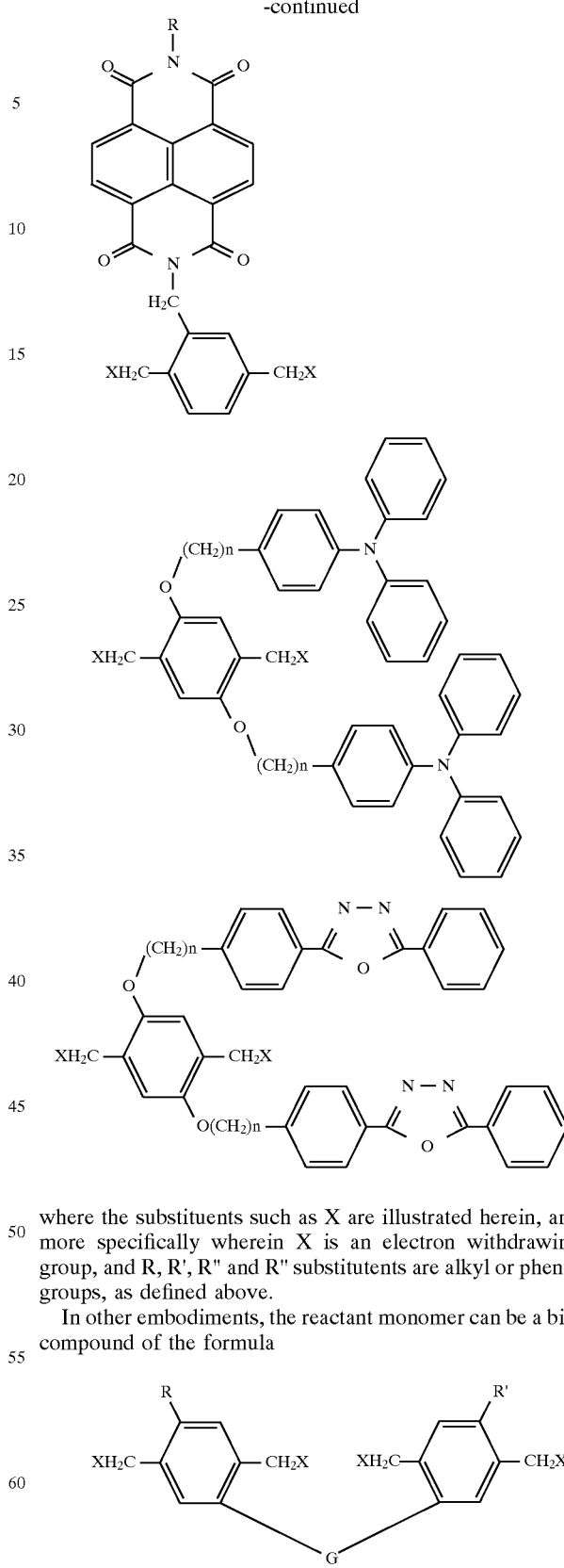
where the substituents such as X are illustrated herein, and more specifically wherein X is an electron withdrawing group, and R, R', R" and R" substitutents are alkyl or phenyl groups, as defined above.
In other embodiments, the reactant monomer can be a bis-compound of the formula where two polymerizable units are coupled or connected by a group G, wherein G can be —$(CH_2)_n$—, —$O(CH_2CH_2O)_n$—, $(CH_3)_2C$—, —O—, —S—, —$S(CH_2)_nS$—, wherein n is an integer from 1 to about 20, phenylene, biphenylene, 1,8-naphtha-3,4,9,10-perylenetetracarboxylic diimide, and the like groups capable of connecting or coupling the polymerizable aromatic units; R and R' can be the same or different and are independently selected from the groups of alkyl, alkoxy, alkylamino and alkylthio groups with from 1 to 25 carbon atoms; and X are the same or different electron withdrawing groups (EWG) such as a halogen (fluorine, chlorine, bromine, iodine), dimethylsulfonium halide, diethylsulfonium halide, and tetrahydrothiophenium halide, methylthio, methylsulfone, phenylsulfoxide, phenylsulfone, thiocyanate, N,N-diethyldithiocarbamate, diethyl phosphonate, cyano, nitro, ethylxanthate, and the like groups.

Other suitable monomers are norbornenyl derivatives containing 1,4-disubstituted arylsubstitutes, while still other monomers are disclosed in the aforementioned commonly owned an assigned U.S. Pat. No. 5,558,904, the disclosure of which has been totally incorporated herein by reference.

Embodiments of the present invention include reactant monomers of the formula Ar(—$CH_2$—X)$_n$ where n is an integer of from 3 to about 12, Ar is aryl as illustrated herein, and X is electron withdrawing group such as, halogen, dimethylsulfonium halide, diethylsulfonium halide, tetrahydrothiophenium halide, methylthio, methylsulfone, phenylsulfoxide, phenylsulfone, thiocyanate, N,N-diethyldithiocarbamate, diethyl phosphonate, cyano, nitro, ethylxanthate, and the like, and mixtures thereof. The aforementioned bis- and Ar(—$CH_2$—X)$_n$ monomers are useful in controlling the degree of branching and the degree of crosslinking in a polymer.

An effective molar ratio of the monomer $XCH_2$—Ar—$CH_2X'$ to the chain end controlling additive R—H is for example from about 1.0:0.001 to about 1.0:2.0. The chain end controlling additive can be added prior to, concurrently with, or after the base is introduced to the polymerization.

Examples of bases include those which are sufficiently basic to deprotonate the chain end controlling additive while not adversely reacting with the monomer or components present in the polymerization reaction mixture. Thus, suitable bases are metal carbonates, alkaline metal alkoxides, alkaline metal hydrides, alkaline metal amides and metal triphenylmethanes. Preferred bases, in embodiments of the present invention, are hindered bases which include, but are not limited to alkaline metal alkoxides such as potassium t-butoxide, lithium t-butoxide; metal hydride such as sodium hydride, lithium hydride and the like; metal amides such as sodium amide, lithium diisopropylamide, lithium bis(trimethylsilyl)amide; and metal triphenylmethanes such as triphenylmethyl lithium, triphenylmethyl sodium, and triphenylmethyl potassium. Combination of bases can be used if desired. The quantity of base used in effecting the polymerization depends upon several factors including the acidity of the chain end controlling additive, the number of active methylene sites in the monomer, and the desired molecular weight of the polymer product. Thus for example the molar ratio of the base to the total monomer and chain controlling additive is from about 3:1 to about 20:1.

The polymerization can be accomplished within various effective times, for example, from about 1 minute to about 72 hours at various effective temperatures for example from about 0 or below to about 150° C. The polymerization, in embodiments, can be accomplished in an organic solvent such as tetrahydrofuran, benzene, toluene, xylenes, N,N'-dimethylformamide, anisole, nitrobenzene, cyanobenzene, chlorobenzene, fluorobenzene, o-dichlorobenzene, bromobenzene, 1,4-dioxane, supercritical $CO_2$, and the like solvents, and mixtures thereof.

The product electroluminecent polymers various effective molecular weights and preferably a weight average molecular weight of from about 1,000 to about 1,000,000, and more preferably from about 10,000 to about 500,000, and which molecular weight properties can be controlled to a high degree by employing chain end controlling additives of the present invention as disclosed and illustrated herein. In embodiments, the product polymer can be an unsubstituted or substituted poly(p-phenylene vinylene), poly(p-naphthalene vinylene), poly(2,5-pyridyl vinylene), and the like polymers.

In embodiments of the present invention there are provided polymerization processes employing chain end controlling additives wherein each chain controlling additive contains at least two acidic protons and wherein there results a block or branched conjugated polymeric product.

Embodiments of the present invention include chain end controlling additives which are, for example, an oligomer or polymer of the formula P(—$CH_2$—X)$_m$, where P represents a polymer or oligomer chain, (—$CH_2$—X) represents active methylene sites appended to the polymer chain P, X is an electron withdrawing group, and m is integer of for example from 1 to about 10,000 and represent the number of active methylene sites appended to the oligomer or polymer chain.

Polymeric chain end controlling additives which are illustrated by way of example, include:

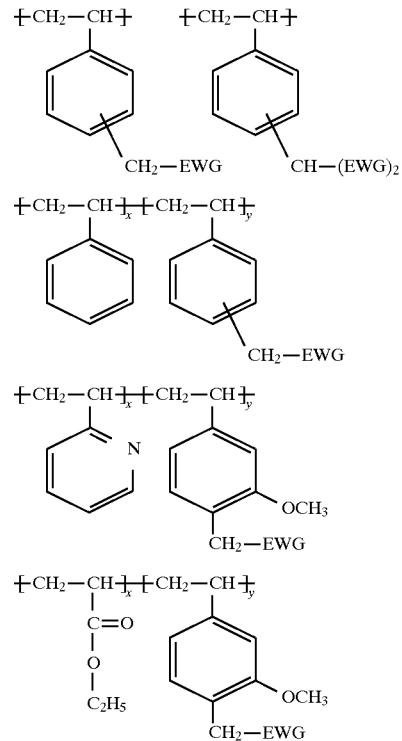

wherein EWG represents an electron withdrawing substituent as defined above, and when the polymeric chain end controlling additive is comprised of more than one monomer constituent, the ratio of electron withdrawing substituent containing monomers to non electron withdrawing substituent containing monomers, x and y are represent the nominal amounts of the respective comonomers and the ratio of x to y can vary from about 0.5:99.5 to about 99.5:0.5. The molecular weight of the polymeric chain end controlling additive can be from about 1,000 to about 100,000.

Polymeric chain end controlling additives can be of the formulas

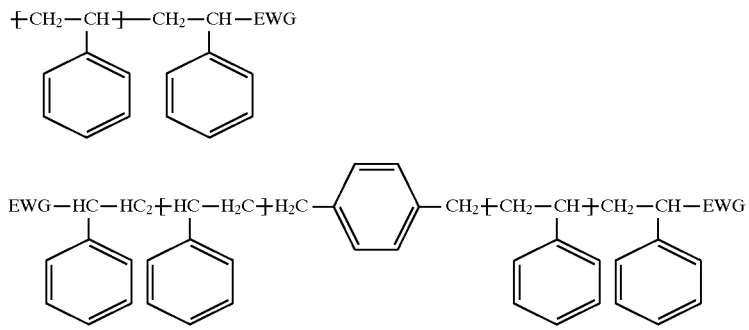

wherein EWG represents an electron withdrawing substituent as defined above. These telechelic polymers can be obtained via living free radical polymerization as disclosed by Matyjaszewski et al., in the *Journal of American Chemical Society*, 1995, 117, 5614–5615. The molecular weight of the polymeric chain end controlling additive can be, for example, from about 1,000 to about 100,000, and preferably from about 5,000 to about 500,000.

The selection of certain appropriated polymeric chain end controlling additives can provide for, in embodiments, the formation of block, branched, graft copolymers having conjugated polymer segments.

In other embodiments of the present invention, there is provided an electroluminescent device comprising: a conductive transparent or semitransparent conductive substrate; an electroluminescent polymer prepared by polymerizing a 1,4 disubstituted aryl or aromatic monomer of the formula $XCH_2$—Ar—$CH_2X'$ in the presence of a base and at least one chain end controlling additive of the formula R—H to form a soluble conjugated poly(arylene vinylene) of the formula

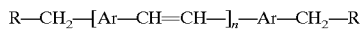

where X and X' are electron withdrawing groups, R—H is a compound containing at least one acidic proton with its pKa values in the range of from about 4 to about 25, Ar is, for example, a 1,4-phenylene compound, 1,4-naphthalene compound, or 2,5-pyridine compound, and n is an integer from about 5 to about 100,000, which polymer is deposited on the substrate as a thin film; and at least one low work function metal electrode is deposited on the polymer thin film. The Ar may optionally contain one or more additional substitutents which impart desired solubility properties to the product polymer as disclosed herein. The film can be formed by conventional coating technologies and is preferably of uniform thickness and, for example, in the range 10 nm to 5 microns.

The present invention, in embodiments, provides a light-emitting electrochemical device, or cell comprising: a conductive transparent or semitransparent conductive substrate; a polyelectrolyte doped electroluminescent polymer prepared by polymerizing a monomer of the formula $XCH_2$—Ar—$CH_2X'$ in the presence of a base and at least one chain end controlling additive of the formula R—H to form a soluble conjugated poly(arylene vinylene) of the formula

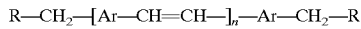

where X and X' are electron withdrawing groups, R—H is a compound containing at least one acidic proton with a pKa value of from about 4 to about 25, Ar is a 1,4-phenylene, 1,4-naphthalene, or 2,5-pyridine compound containing hydrophilic or hydrophobic substituents, and preferably ion binding active or polyelectrolyte substituents, for example, alkoxy, oligomeric alkylene glycols, crown ethers, or sulfonic acids, and n is an integer from about 5 to about 100,000 and represents the number of repeat segments, which polymer is deposited on the substrate as a thin film; and at least one metal electrode deposited on the polyelectrolyte doped polymer thin film. The polyelectrolyte substituents are preferably ionomers and ionophores, including poly(pyridinium triflate), poly(pyridinium tetrafluoroborate), bis(pyrylium tetrafluoroborate), and polyethylene glycol or crown ether complexes of salts such as lithium trifluoro methanesulfonate and tetrabutlyammonium p-toluene sulfonate, and mixtures thereof, wherein ionizable salts thereof may be formed prior to, during, or after the polymerization reaction.

The electroluminecent polymers and devices of the present invention exhibit electroluminescence at from about 400 to about 700 nm.

In an exemplary embodiment, a solution of 1,4-bis (halomethyl)benzene monomer or mixed monomers (1.0 molar) in a solvent is prepared in a three necked round bottom flask equipped with a mechanical stirrer and an addition funnel, an inert gas inlet, and a condenser. A base (of about 2 to about 10 molar)charged to the addition funnel, can be added to the solution of monomer. A chain end controlling additive is added into the monomer solution, followed by the addition of the base solution. The chain end controlling additive can also be added into the base solution first, followed by addition to the monomer solution. The chain end controlling additive can also be added after the base solution has been introduced to the monomer solution. Additional chain end controlling additive can be added after polymerization has been completed. The polymerization may be carried out at temperature range of about −78° to about 150° C. The polymerization may proceed for about 2 to about 200 hours. The resulting polymer mixture is poured into a non-solvent to precipitate the polymer. The polymer may be purified further by dissolving it in a suitable solvent, followed by precipitation into a non-solvent. This purification process can be repeated, for example up to 20 times, in order to obtain high purity polymer with narrow molecular weight distribution. The progress can be monitored and the completion of the polymerization can be determined by gel permeation chromatography.

The molar ratio of a monomer to a chain end controlling additive can range from about 2 to about 1,000, and preferably in the range of from about 50 to about 200. The molecular weights of the resulting polymer are proportional to the molar ratio of the monomer and the chain end controlling additives. Thus, in embodiments, it is possible to control the molecular weight of the resulting polymer to a considerable extent by, for example, empirical selection of the molar ratio of the monomer and the chain end controlling additives.

Preferred solvents for polymerization include, but are not limited to: benzene, toluene, chlorobenzene, tetrahydrofuran, ether, 1,2-dimethoxyethane, anisole, nitrobenzene, liquid ammonia, dimethylformamide, supercritical fluids such as carbon dioxide, and the like. Preferred solvents for polymer solubilization include methylene chloride, chloroform, 1,2-dichloroethane, 1,1,2-trichloroethane, o-dichlorobenzene, chlorobenzene, tetrahydrofuran, and the like. The non-solvents for polymer precipitation and purification include methanol, ethanol, isopropanol, hexanes, octanes, acetone, acetonitrile, nitromethane, ether, and the like solvents. The amount of solvent selected is guided by the solubility of the reactants and the polymer product and by considerations of the film coating process.

Another embodiment of the present invention relates to the fabrication of light-emitting devices using the soluble side chain poly(p-phenylene vinylene) and analogous polymers disclosed herein. A fabrication process, in embodiments, includes the steps: (1) preparing a dilute solution of a soluble poly(p-phenylene vinylene) in a suitable solvent; (2) filtering the solution through 0.1 to 0.45 micron filter; (3) degassing with, for example, nitrogen or argon to remove oxygen from the solution; (4) depositing a thin film of the poly(p-phenylene vinylene) on a transparent or semitransparent conductive substrate under an inert atmosphere; (5) drying the film to remove solvent and annealing the resulting polymer thin film at about 30° C. to about 200° C. for from about 5 minutes to about 2 hours under vacuum or under an inert atmosphere; (6) optionally depositing a molecular or polymeric electron transport layer on the film; and (7) depositing cathodes on the polymer films or optional electron transport layer to give an electroluminescent device comprising chain end modified poly(phenylene vinylene) or analogous polymers.

Preferred solvents for polymer solubilization and film coating step include, for example, methylene chloride, chloroform, 1,2-dichloroethane, 1,1,2-trichloroethane, o-dichlorobenzene, chlorobenzene, tetrahydrofuran, and the like.

In embodiments, preferred semi-transparent conductive substrates include indium tin oxide or gold coated glass, quarts, polyester, polycarbonate, polysulfone, and the like materials known to those of ordinary skill in the art. The indium tin oxide or gold can also, if desired, be overcoated with a thin carbon layer. Also included within the scope of the present invention for the preparation of EL devices are thin layers of p-doped conjugated polymer such as polypyrrole, polythiophene, or polyaniline, which can be readily deposited on, for example, the indium tin oxide layer.

In another embodiment, an electron transport layer can be deposited on the poly(p-phenylene vinylene) thin film to give a two-layer device. reference for example, the aforementioned U.S. Pat. No. 5,558,904.

In embodiments, preferred cathodes are low work function metals such as lithium, magnesium, calcium, aluminum, and alloys thereof.

The following examples are illustrative of the invention embodied herein. All amounts are by weight percent unless specified otherwise.

Comparative Example I shows gellation of poly[2-methoxy-5-(2'-ethylhexyloxy)-1,4-phenylene vinylene] (MEH-PPV), a prototypical PPV derivative under various polymerization conditions which did not produce readily soluble materials. Examples I–VII show the formation of soluble MEH-PPV and the control of its molecular weights by the addition of chain end controlling (CEC) additives.

COMPARATIVE EXAMPLE I

Procedure A

Monomer was prepared according to the procedure disclosed in *The Journal of American Chemical Society*, 115, 10117 (1993).

Procedure B

To a solution of monomer (1.0 g, 0.003 mol) in THF (60 mL) was added 1.0M potassium tert-butoxide (t-BuOK, 3.0 mL, 0.003 mol). The resulting solution was stirred for one hour before adding additional 1.0M t-BuOK solution (9.0 mL) dropwise. The reaction mixture gelled during the addition. The resulting gel was insoluble in typical organic solvents as recited above.

Procedure C

A solution of 1.0M t-BuOK (10 mL, 0.01 mol) in an addition funnel was diluted with THF (50 mL). Five(5) mL of the resulting t-BuOK solution was added to a stirring solution of the monomer (1.0 g, 0.003 mol) in THF (60 mL). After one hour, another 5 mL of the t-BuOK solution was added. This was repeated for another hour. The remaining t-BuOK solution was added after another hour to provide a very viscous red solution. The complete addition took 4 hours. The reaction was continued for another hour and then poured into methanol (500 mL). The red precipitate (0.4 g, 51%) was collected and air dried. This product initially appeared to be soluble in THF and chloroform. However, the resulting solution could not be easily filtered through a 0.45 micron filter, indicating that a substantial portion of the product was insoluble.

EXAMPLES I–VII

The accompanying Table summarizes the polymerization of monomer 2-methoxy-5-(2'-ethylhexyloxy)-1,4-bis (chloromethyl)benzene in the presence of a chain end controlling additive, 4-t-butylbenzyl chloride. In all the reported table entries, soluble MEH-PPV, that is 2-Methoxy-5-(2'-ethylhexyloxy)-poly(phenylene vinylene), products were obtained. The weight average (Mw) and number average (Mn) molecular weights of MEH-PPV were characterized by gel permeation chromatography against polystyrene standards in THF. Examples I–III indicate that the molecular weights of the MEH-PPV products were proportional to the molar ratio of the monomer and the chain end controlling additive. Also, Example III–V indicate that the molecular weights of MEH-PPV products decrease as the volume of THF decreases. The data suggests that the molecular weights of MEH-PPV products are inversely proportional to the concentration of the chain end controlling additive. The concentration of the chain end controlling additive is believed to be an important factor in controlling the molecular weight of the soluble polymer product.

Polymerization conditions were essentially the same as in Comparative Example I above, with the exceptions that a chain end controlling additive was present, variation in solvent concentrations, and ratio of reactants as indicated. The results are exemplified in the following procedure for Examples I–VII. The results are contained in Table 1. 2-Methoxy-5-(2'-ethylhexyloxy)-1,4-bis(chloromethyl) benzene (3.0 g, 0.009 mol) was placed in an 1 L three necked round bottom flask equipped with a mechanical stirrer, a 250 mL addition funnel capped with a rubber septum, a vacuum adapter and a rubber septum. The system was evacuated and then purged with argon twice. Sodium dried THF solvent (300 mL) was added via a syringe into the flask, and 4-t-butylbenzylchloride (1.0 g) was then added via another syringe. 1.0M t-BuOK in THF (80 mL, 0.08 mol) was added via another syringe into the addition funnel. The t-BuOK solution was added quickly to the reaction flask. The resulting red viscous solution was stirred overnight and then poured into methanol (1500 mL). The precipitated red solid was collected and air dried to provide a soluble MEH-PPV.

TABLE 1

Polymerizations with 4-t-butylbenzylchloride as an CEC additive.

| Example Number | Monomer weight(g)/ THF volume (mL) | Weight of chain end controlling additive (g) | The molar ratio of monomer to the additive | 1.0 M t-BuOK in THF (mL) | Mw/Mn (×10³) |
|---|---|---|---|---|---|
| I | 3.00/300 | 1.00 | 1.65 | 80 | 85/11.3 |
| II | 3.33/300 | 0.20 | 9.15 | 80 | 172/151 |
| III | 3.33/300 | 0.10 | 18.30 | 80 | 331/66.5 |
| IV | 3.00/200 | 0.10 | 18.30 | 80 | 199/39.1 |
| V | 3.00/150 | 0.10 | 18.30 | 80 | 164/26.9 |
| VI | 3.33/100 | 0.60 | 3.05 | 80 | 131/15.8 |
| VII | 3.33/100 | 0.30 | 6.10 | 80 | 291/21.5 |

Other modifications of the present invention may occur to one of ordinary skill in the art based upon a review of the present application and these modifications, including equivalents thereof, are intended to be included within the scope of the present invention.

What is claimed is:

1. An electroluminescent device comprising: a conductive transparent or semitransparent conductive substrate; an electroluminescent polymer prepared by polymerizing a monomer of the formula $XCH_2$—Ar—$CH_2X'$ in the presence of a base and at least one chain end controlling additive of the formula R—H to form a soluble conjugated poly(arylene vinylene) of the formula R—CH$_2$—[Ar—CH=CH—]$_n$—Ar—CH$_2$—R
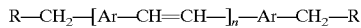

where X and X' are electron withdrawing groups, R—H is a material containing at least one acidic proton with a pKa value in the range of from about 4 to about 25, Ar is a 1,4-phenylene compound, a 1,4-naphthalene compound, or a 2,5-pyridine group, and n is an integer of from about 5 to about 100,000, which polymer is deposited on the substrate as a thin film; and at least one low work function metal electrode deposited on the polymer thin film.

2. A device in accordance with claim 1, wherein the film is of uniform thickness and is in the range of from about 10 nm to about 5 microns.

3. A light-emitting electrochemical cell device comprising: a conductive transparent or semitransparent conductive substrate; a polyelectrolyte doped electroluminescent polymer prepared by polymerizing a monomer of the formula $XCH_2$—Ar—$CH_2X'$ in the presence of a base and at least one chain end controlling additive of the formula R—H to form a soluble conjugated poly(arylene vinylene) of the formula R—CH$_2$—[Ar—CH=CH—]$_n$—Ar—CH$_2$—R
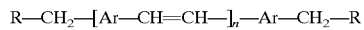

where X and X' are electron withdrawing groups, R—H is a compound containing at least one acidic proton with a pKa value of from about 4 to about 25, Ar is a 1,4-phenylene, 1,4-naphthalene, or 2,5-pyridine compound containing hydrophilic or hydrophobic substituents selected from the group of alkoxy, oligomeric alkylene glycols, crown ethers, or sulfonic acids, and n is an integer from about 5 to about 100,000, which polymer is deposited on the substrate as a thin film; and at least one metal electrode deposited on the polyelectrolyte doped polymer thin film.

4. A light-emitting electrochemical cell device in accordance with claim 3 wherein the polyelectrolyte is selected from the group consisting of ionizable salts of ionomers and ionophores.

5. A device in accordance with claims 3 wherein the electroluminecent polymer has electroluminescence at from about 400 to about 700 nm.

* * * * *